(12) United States Patent
Huang et al.

(10) Patent No.: US 11,206,585 B2
(45) Date of Patent: Dec. 21, 2021

(54) HANDOVER METHOD AND DEVICE INVOLVING MULTIPLE CORE NETWORKS

(71) Applicant: XI'AN ZHONGXING NEW SOFTWARE CO., LTD., Xi'An (CN)

(72) Inventors: He Huang, Shenzhen (CN); Jianmin Fang, Shenzhen (CN); Xiaojuan Shi, Shenzhen (CN)

(73) Assignee: Xi'an Zhongxing New Software Co., Ltd., Xi'an (CN)

( * ) Notice: Subject to any disclaimer, the term of this patent is extended or adjusted under 35 U.S.C. 154(b) by 143 days.

(21) Appl. No.: 16/496,854

(22) PCT Filed: Mar. 21, 2018

(86) PCT No.: PCT/CN2018/079695
§ 371 (c)(1),
(2) Date: Sep. 23, 2019

(87) PCT Pub. No.: WO2018/171594
PCT Pub. Date: Sep. 27, 2018

(65) Prior Publication Data
US 2020/0092764 A1 Mar. 19, 2020

(30) Foreign Application Priority Data
Mar. 23, 2017 (CN) .......................... 201710179254.8

(51) Int. Cl.
*H04W 36/00* (2009.01)
*H04W 36/08* (2009.01)
*H04W 36/14* (2009.01)

(52) U.S. Cl.
CPC ... *H04W 36/0066* (2013.01); *H04W 36/0016* (2013.01); *H04W 36/0033* (2013.01); *H04W 36/08* (2013.01); *H04W 36/14* (2013.01)

(58) Field of Classification Search
None
See application file for complete search history.

(56) References Cited

U.S. PATENT DOCUMENTS

2012/0135709 A1   5/2012  Deng et al.
2014/0135015 A1*  5/2014  Liu ...................... H04W 28/08
                                                              455/436
(Continued)

FOREIGN PATENT DOCUMENTS

CN        101365239 A    2/2009
CN        101959270 A    1/2011
(Continued)

OTHER PUBLICATIONS

International Search Report of Application No. PCT/CN2018/079695—4 pages (dated Jun. 11, 2018).
(Continued)

*Primary Examiner* — Alpus Hsu
*Assistant Examiner* — Camquyen Thai
(74) *Attorney, Agent, or Firm* — Knobbe Martens Olson & Bear LLP (57) ABSTRACT

Provided are a handover method and device involving multiple core networks. The method includes: transmitting, by a first base station, a handover request message to a second base station directly transmitting or through a core network; receiving, by the first base station, a feedback message from the core network or the second base station, where the feedback message carries at least one of: information about a core network suggested to be handed over, a failure reason.

12 Claims, 8 Drawing Sheets

(56) References Cited

U.S. PATENT DOCUMENTS

| | | | | |
|---|---|---|---|---|
| 2014/0171083 A1* | 6/2014 | Zhang | ............... | H04W 36/0061 |
| | | | | 455/436 |
| 2014/0248882 A1* | 9/2014 | Wang | ............... | H04W 36/0079 |
| | | | | 455/436 |
| 2016/0021572 A1 | 1/2016 | Lim et al. | | |
| 2017/0156095 A1* | 6/2017 | Balan | .................. | H04W 28/08 |
| 2018/0227816 A1* | 8/2018 | Wu | ....................... | H04W 76/10 |

FOREIGN PATENT DOCUMENTS

| | | |
|---|---|---|
| CN | 101998542 A | 3/2011 |
| CN | 103841613 A | 6/2014 |
| CN | 104113875 A | 10/2014 |
| CN | 105376811 A | 3/2016 |
| CN | 105993194 A | 10/2016 |
| CN | 106304220 A | 1/2017 |
| CN | 106454791 A | 2/2017 |
| CN | 105993194 B | 12/2019 |

OTHER PUBLICATIONS

Huawei, HiSilicon "Discussion on LTE-NR handover" 3GPP TSG-RAN WG2 NR AdHoc Meeting, Jan. 17-19, 2017, R2-1700184.
First Search Report for CN 201710179254.8.
First Office Action for CN 201710179254.8.

* cited by examiner

HANDOVER METHOD AND DEVICE INVOLVING MULTIPLE CORE NETWORKS

CROSS-REFERENCE TO RELATED APPLICATIONS

This application is a US national phase application of international patent application No. PCT/CN2018/079695 filed on Mar. 21, 2018, which claims priority to Chinese patent application No. 201710179254.8, entitled "HANDOVER METHOD AND DEVICE INVOLVING MULTIPLE CORE NETWORKS" and filed on Mar. 23, 2017, the disclosure of which is incorporated therein by reference in its entirety.

TECHNICAL FIELD

The present disclosure relates to communications and, in particular, to a handover method and device involving multiple core networks.

BACKGROUND

In the 5G network, three types of base stations, i.e., a Next Generation Node B (gNB), a Long Term Evolution (LTE) Evolved Node B (eNB), and an enhanced Long Term Evolution (eLTE) eNB are provided. The gNB is a 5G base station connected to a Next Generation Core Network (NGC) through a NG interface, the LTE eNB is a 4G base station connected to an Evolved Packet Core (EPC) through an S1 interface, and the eLTE eNB is a transition-type base station from 4G to 5G and is capable of being connected to an EPC (through the S1 interface) and an NGC (through the NG interface) at the same time. A connection interface between the LTE eNBs is called an X2 interface, a connection interface between the gNBs is called an Xn interface, and the eLTE eNB can play the role of both LTE eNB and gNB. The first base station performs the handover on the second base station, when the second base station is eLTE eNB, since the eLTE eNB may be connected to the EPC and the NGC at the same time, the handover becomes complicated, and especially, performing which type of core network handover becomes a problem. Therefore, in the 5G network, especially when the second base station is connected to multiple core networks, how to perform the handover between the base stations becomes an urgent problem to be solved.

SUMMARY

To solve the above technical problem, an embodiment of the present disclosure provides a handover method and device for core networks.

The present application provides a handover method involving multiple core networks, including: transmitting, by a first base station, a handover request message to a second base station directly or through a core network; and receiving, by the first base station, a feedback message from the core network or the second base station, where the feedback message carries at least one of: information about a core network suggested to be handed over, a failure reason.

Transmitting the handover request message to the second base station includes at least one of: transmitting, by the first base station, the handover request message to the second base station, the handover request message carries a handover type, the handover type indicates a handover for connecting to a NGC or an EPC; transmitting, by the first base station, the handover request message to the second base station, the handover request message is one of: an Xn interface handover request message, a handover request message for connecting to the NGC, a handover request message for connecting to the EPC; and transmitting, by the first base station, the handover request message to the second base station through a new TNL interface between base stations, the new TNL interface between the base stations is a TNL interface for an Xn interface message.

After receiving the feedback message from the second base station, the method further includes: determining whether to initiate a handover request message of another handover type to the second base station according to the feedback message, the another handover type is different from a handover type initiated by the handover request message.

After receiving the feedback message from the second base station, the method further includes: in response to determining to initiate the handover request message of the another handover type to the second base station, redetermining a handover type according to the information about a core network suggested to be handed over by the second base station and information about a core network supported by a cell of the first base station; and retransmitting the handover request message to the second base station, the handover request message carries information about the redetermined handover type.

Before transmitting the handover request message to the second base station, the method further includes: receiving at least one of information about a core network suggested to be handed over, load information for each core network supported by a cell of the second base station; and determining a handover type according to at least one of the information about a core network suggested to be handed over, load information for each core network supported by the cell of the second base station; and transmitting the handover request message to the second base station includes: transmitting a corresponding handover request message to the second base station according to the determined handover type.

A handover method involving multiple core networks includes: receiving a handover request message from a first base station; transmitting a feedback message to the first base station, the feedback message carries at least one of: information about a core network suggested to be handed over, a failure reason.

Transmitting the feedback message to the first base station includes at least one of: in response to determining that handover of a handover type is incapable of being executed, returning the feedback message to the first base station.

The handover request message satisfies at least one of: carrying a handover type, the handover type indicates a handover for connecting to a NGC or an EPC; the handover request message is one of: an Xn interface handover request message, a handover request message for connecting to the NGC, a handover request message for connecting to the EPC; and transmitting through a new TNL interface between base stations, the new TNL interface between the base stations is a TNL interface for an Xn interface message.

After transmitting the feedback message to the first base station, the method further includes: receiving a handover request message retransmitted by a second base station.

Before receiving the handover request message from the first base station, the method further includes: transmitting at least one of information about a core network suggested to be handed over and/or load information for each core network supported by a cell of the second base station to the first base station to enable the first base station to determine a handover type corresponding to the handover request message.

A handover device involving multiple core networks includes: a first transmission module, configured to directly transmit a handover request message to a second base station or transmit the handover request message to the second base station through a core network; a second reception module, configured to receive a feedback message from the core network or the second base station, the feedback message carries at least one of: information about a core network suggested to be handed over, a failure reason.

The first transmission module is configured to transmit the handover request message to the second base station includes one of: transmitting, by the first base station, the handover request message to the second base station, the handover request message carries a handover type, the handover type is a handover for connecting to a NGC or an EPC; transmitting, by the first base station, the handover request message to the second base station, the handover request message is one of: an Xn interface handover request message, a handover request message for connecting to the NGC, a handover request message for connecting to the EPC; and transmitting, by the first base station, the handover request message to the second base station through a new TNL interface between base stations, the new TNL interface between the base stations is a TNL interface for an Xn interface message.

The first reception module is further configured to receive information about a core network suggested to be handed over and/or load information for each core network supported by the cell of the second base station; the device further includes: a first determination module, configured to determine a handover type according to the information about a core network suggested to be handed over and the load information for each core network supported by the cell of the second base station; the first transmission module is configured to transmit a corresponding handover request message to the second base station according to the determined handover type.

The first determination module is further configured to determine whether to initiate a handover request message of another handover type to the second base station according to the feedback message, the another handover type is different from a handover type initiated by the handover request message.

The first determination module is further configured to, in response to determining to initiate the handover request message of the another handover type to the second base station, redetermine a handover type according to the information about a core network suggested to be handed over by the second base station and core network information supported by the cell of the first base station; and the first transmission module is further configured to retransmit the handover request message to the second base station, the handover request message carries information about the handover type redetermined by the first determination module.

A handover device involving multiple core networks includes: a second reception module, configured to receive a handover request message from a first base station; a second transmission module, configured to transmit a feedback message to the first base station, the feedback message carries at least one of: information about a core network suggested to be handed over, a failure reason.

The second transmission module is configured to, in response to determining that handover of a handover type is incapable of being executed, return the feedback message to the first base station.

The handover request message satisfies at least one of: carrying a handover type, the handover type indicates a handover for connecting to a NGC or an EPC; the handover request message is one of: an Xn interface handover request message, a handover request message for connecting to the NGC, a handover request message for connecting to the EPC; and being transmitted through a new TNL interface between base stations, the new TNL interface between the base stations is a TNL interface for an Xn interface message.

The second reception module is further configured to receive the handover request message retransmitted by the second base station.

The second transmission module is further configured to transmit information about a core network suggested to be handed over and/or load information for each core network supported by a cell of the second base station to the first base station to enable the first base station to determine a handover type corresponding to the handover request message.

A handover device involving multiple core networks includes a processor and a memory storing computer-executable instructions.

The computer-executable instructions, when executed by the processor, execute the following method: transmitting a handover request message to a second base station directly or through a core network; receiving a feedback message from the core network or the second base station, the feedback message carries at least one of: information about a core network suggested to be handed over, a failure reason. Alternatively, the computer-executable instructions, when executed by the processor, execute the following methods: receiving a handover request message from a first base station; transmitting a feedback message to the first base station, the feedback message carries at least one of: information about a core network suggested to be handed over, a failure reason.

The method and device, in the 5G network, especially when the second base station is connected to multiple core networks, are able to implement selection of the handover type and the handover among the multiple core networks.

Other features and advantages of the present disclosure will be elaborated hereinafter in the description and, moreover, partially become apparent from the description, or will be understood through implementation of the present disclosure. The object and other advantages of the present disclosure may be implemented and obtained through structures set forth in the description, claims and drawings.

BRIEF DESCRIPTION OF DRAWINGS

The drawings are used to provide a further understanding of the technical solutions of the present disclosure, constitute a part of the specification, explain the technical solutions of the present disclosure in conjunction with the embodiments of the present application, and do not limit the technical solutions of the present disclosure.

DETAILED DESCRIPTION

Objects, technical solutions and advantages of the present disclosure will be clearer from a detailed description of embodiments of the present disclosure in conjunction with the drawings. It is to be noted that if not in collision, the embodiments and features therein in the present application may be combined with each other.

The steps shown in the flowcharts of the drawings may be performed by a computer system such as a group of computers capable of executing instructions. Although logical sequences are shown in the flowcharts, the shown or described steps may be performed in sequences different from those described herein in some cases.

In the 5G network, when the second base station is connected to multiple core networks, for the handover between the base stations, the present application proposes technical solutions described below.

Embodiment One

Figure 1:
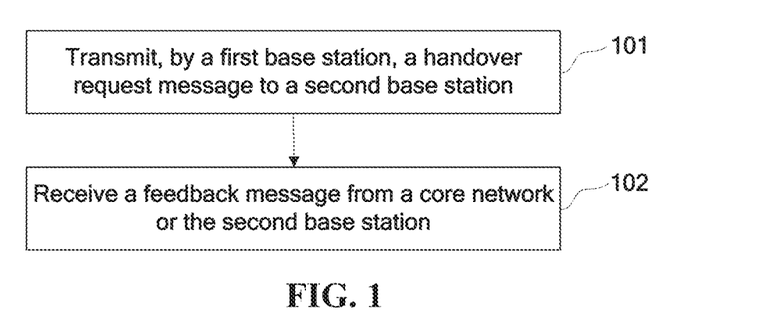
FIG. 1 is a flowchart of a handover method for core networks according to embodiment one of the present disclosure.

As shown in FIG. 1, a handover method involving multiple core networks may include steps described below.

In step 101, a first base station transmits a handover request message to a second base station in directly or through a core network.

In step 102, the first base station receives a feedback message from the core network or the second base station, the feedback message carries at least one of: information about a core network suggested to be handed over, a failure reason.

Transmitting the handover request message to the second base station may include at least one of: 1) transmitting, by the first base station, the handover request message to the second base station, the handover request message carries a handover type, the handover type indicates a handover for connecting to a NGC or an EPC; 2) transmitting, by the first base station, the handover request message to the second base station, the handover request message is one of: an Xn interface handover request message, a handover request message for connecting to the NGC, a handover request message for connecting to the EPC; and 3) transmitting, by the first base station, the handover request message to the second base station through a new TNL interface between base stations, the new TNL interface between the base stations is a TNL interface for an Xn interface message.

After receiving the feedback message from the second base station, the method further includes: determining whether to initiate a handover request message of another handover type to the second base station according to the feedback message, the another handover type is different from a handover type initiated by the handover request message.

After receiving the feedback message from the second base station, the method further includes: in response to determining to initiate the handover request message of the another handover type to the second base station, redetermine a handover type according to the information about a core network suggested to be handed over by the second base station and information about a core network supported by a cell of the first base station; and retransmit the handover request message to the second base station, the handover request message carries information about the redetermined handover type.

Before transmitting the handover request message to the second base station, the method further includes: receiving at least one of information about a core network suggested to be handed over and load information for each core network supported by a cell of the second base station; and determining a handover type according to at least one of the information about a core network suggested to be handed over and load information for each core network supported by the cell of the second base station; and transmitting the handover request message to the second base station includes: transmitting a corresponding handover request message to the second base station according to the determined handover type.

Figure 2:
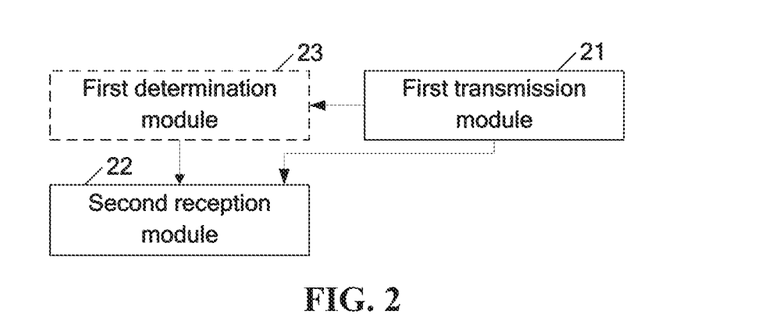
FIG. 2 is a structure diagram of a handover device for core networks according to embodiment one of the present disclosure.

As shown in FIG. 2, a handover device involving multiple core networks as shown in FIG. 2, includes: a first transmission module 21, configured to directly transmit a handover request message to a second base station or transmit the handover request message to the second base station through a core network; a second reception module 22, configured to receive a feedback message from the core network or the second base station, the feedback message carries at least one of: information about a core network suggested to be handed over, a failure reason.

The first transmission module 21 may be configured to transmit the handover request message to the second base station includes one of: 1) transmitting, by the first base station, the handover request message to the second base station, the handover request message carries a handover type, the handover type indicates a handover for connecting to a NGC or an EPC; 2) transmitting, by the first base station, the handover request message to the second base station, the handover request message is one of: an Xn interface handover request message, a handover request message for connecting to the NGC, a handover request message for connecting to the EPC; and 3) transmitting, by the first base station, the handover request message to the second base station through a new TNL interface between base stations, the new TNL interface between the base stations is a TNL interface for an Xn interface message.

A first reception module 22 is further configured to receive information about a core network suggested to be handed over and/or load information for each core network supported by the cell of the second base station; the device further includes: a first determination module 23, which is configured to determine a handover type according to the information about a core network suggested to be handed over and load information for each core network supported by the cell of the second base station; the first transmission module 21 is configured to transmit a corresponding handover request message to the second base station according to the determined handover type.

The first determination module 23 is further configured to determine whether to initiate a handover request message of another handover type to the second base station according to the feedback message, the another handover type is different from a handover type initiated by the handover request message.

The first determination module 23 is further configured to, in response to determining to initiate the handover request message of the another handover type to the second base station, redetermine a handover type according to the information about a core network suggested to be handed over by the second base station and core network information supported by the cell of the first base station; and the first transmission module 21 is further configured to retransmit the handover request message to the second base station, the handover request message carries information about the handover type redetermined by the first determination module.

In the embodiment, the first transmission module 21, the first reception module 22 and the first determination module 23 may respectively be implemented by software, hardware, or a combination thereof. In actual application, the first transmission module 21 and the first reception module 22 may be implemented by a communications unit of the base station, and the first determination module 23 may be implemented by a processor of the base station. Or the first transmission module 21, the first reception module 22 and the first determination module 23 may respectively be implemented by software, hardware, or a combination thereof. No limitation is made herein. The processor is usually an overall operation controlling a server to which the processor belongs. For example, the processor executes operations such as computation and acknowledgement. For example, the processor may be a CPU. The communications unit usually includes one or more components which allow wireless communications between a server to which the communications unit belongs and a wireless communication system or network.

A handover device involving multiple core networks includes: a processor and a memory, where the memory is configured to store computer-executable instructions which, when executed by the processor, the computer-executable instructions implement the following methods: transmitting a handover request message to a second base station directly or through a core network; receiving a feedback message from the core network or the second base station, the feedback message carries at least one of: information about a core network suggested to be handed over, a failure reason.

The handover device involving multiple core networks in the embodiment may be implemented by being deployed on the base station or another similar device. No limitation is made herein. The two handover devices involving multiple core networks in the embodiment may implement all details of the method in the embodiment, and their implementation principles are same. The description related to the method may be referred to.

Embodiment Two

Figure 3:
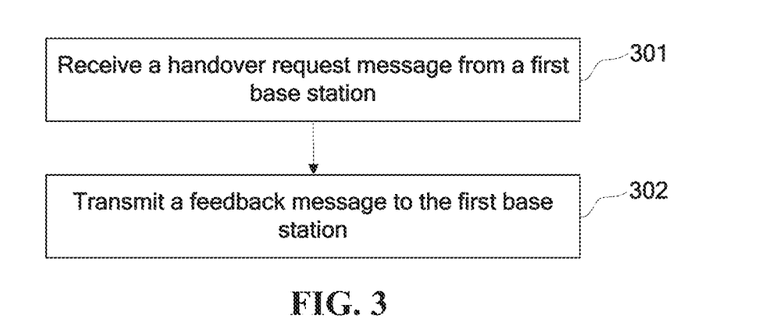
FIG. 3 is a flowchart of a handover method for core networks according to embodiment two of the present disclosure.

As shown in FIG. 3, a handover method involving multiple core networks may include steps described below.

In step 301, a handover request message is received from a first base station.

In step 302, a feedback message is transmitted to the first base station, the feedback message carries at least one of: information about a core network suggested to be handed over; a failure reason.

The step in which the feedback message is transmitted to the first base station includes when a handover of a handover type is incapable of being executed, returning the feedback message to the first base station.

The handover request message satisfies at least one of: 1) carrying a handover type, the handover type indicates a handover for connecting to a NGC or an EPC; 2) the handover request message is one of: an Xn interface handover request message, a handover request message for connecting to the NGC, a handover request message for connecting to the EPC; and 3) transmitting through a new TNL interface between base stations, the new TNL interface between the base stations is a TNL interface for an Xn interface message.

After transmitting the feedback message to the first base station, the method further includes: receiving a handover request message retransmitted by a first base station.

Before receiving the handover request message from the first base station, the method further includes: transmitting at least one of information about a core network suggested to be handed over and/or load information for each core network supported by a cell of the second base station to the first base station to enable the first base station to determine the handover request.

Figure 4:
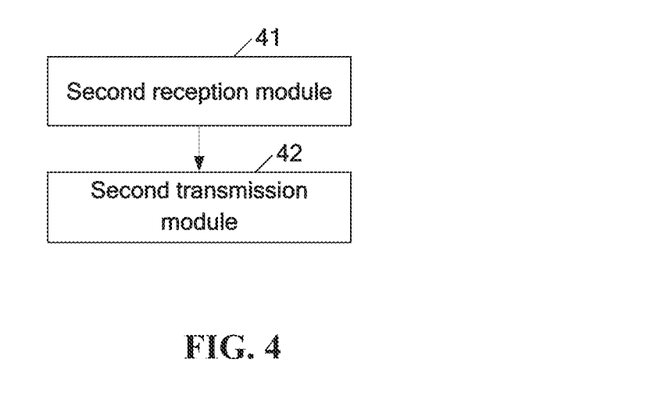
FIG. 4 is a structure diagram of a handover device for core networks according to embodiment two of the present disclosure.

As shown in FIG. 4, a handover device involving multiple core networks may include: a second reception module 41, configured to receive a handover request message from a first base station; a second transmission module 42, configured to transmit a feedback message to the first base station, the feedback message carries at least one of: information about a core network suggested to be handed over, a failure reason.

The second reception module 41 is further configured to receive the handover request message retransmitted by the first base station.

The handover request message satisfies at least one of: 1) carrying a handover type, the handover type is a handover for connecting to a NGC or an EPC; 2) the handover request message is one of: an Xn interface handover request message, a handover request message for connecting to the NGC, a handover request message for connecting to the EPC; and 3) transmitting through a new TNL interface between base stations, the new TNL interface between the base stations is a TNL interface for an Xn interface message.

The second reception module 41 is further configured to receive the handover request message retransmitted by the second base station.

The second transmission module 42 is further configured to transmit information about a core network suggested to be handed over and/or load information for each core network supported by a cell of the second base station to the first base station to enable the first base station to determine a handover type corresponding to the handover request message.

In the embodiment, the second transmission module 42 and the first reception module 41 may respectively be implemented by software, hardware, or a combination thereof. In actual application, the second transmission module 42 and the first reception module 41 may be implemented by a communications unit of the base station, and the second transmission module 42 and the first reception module 41 may be implemented by combining the processor and the communications unit. No limitation is made herein. The processor is usually an overall operation controlling a server to which the processor belongs. For example, the processor executes operations such as computation and acknowledgement. For example, the processor may be a CPU. The communications unit usually includes one or more components which allow wireless communications between a server to which the communications unit belongs and a wireless communication system or network.

A handover device involving multiple core networks includes: a processor and a memory, where the memory is configured to store computer-executable instructions which, when executed by the processor, the computer-executable instructions implement the following methods: receiving a handover request message from a first base station; transmitting a feedback message to the first base station, the feedback message carries at least one of: information about a core network suggested to be handed over, a failure reason.

The handover device involving multiple core networks in the embodiment may be implemented by being deployed on the base station or another similar device. No limitation is made herein. The two handover devices involving multiple core networks in the embodiment may implement all details of the method in the embodiment, and their implementation principles are same. The description related to the method may be referred to.

Embodiment Three

The embodiment provides a handover method involving multiple core networks, the handover method is implemented by interaction between a first base station and a second base station. In the handover method involving multiple core networks in the embodiment, the first station directly transmits a handover request message to the second base station or the first station transmits the handover request message to the second base station through a core network. The second base station or the core network returns a feedback message to the first base station, the feedback message carries information about a core network suggested to be handed over and/or a failure reason, A handover method involving multiple core networks in the embodiment may specifically include: first, the first base station receives information about a core network suggested to be handed over and load information for each core network supported by a cell of the second base station. The load information may include Transport Network Layer Load (TNL load) connected to a NGC and/or TNL load connected to an EPC; next, the first base station determines a handover type according to the information about a core network suggested to be handed over and/or load information for each core network supported by a cell of the second base station, and a core network (supporting the EPC and/or the NGC) supported by a cell of the first base station. The handover type may be a handover for connecting to the NGC, a handover for connecting to the EPC or a handover crossing the core network; next, the first base station transmits the handover request message to the second base station, and carries the handover type (such as the handover for connecting to the NGC, the handover for connecting to the EPC), or the first base station transmits a new handover request message to the second base station (such as a handover request message of an Xn interface, a handover request message for connecting to the NGC, the handover request message for connecting to the EPC), or the first base station transmits the handover request message to the second base station through a new TNL interface between base stations, (a TNL interface specifically for an Xn interface message) to enable the second base station to know which type of the handover is; fourth, the second base station returns the feedback message, the feedback message carries the information about a core network suggested to be handed over and the failure reason; fifth, the first base station transmits the handover request message to the second base station through the core network (the NGC or the EPC), and the core network or the second base station returns the feedback message, the feedback message carries the information about a core network suggested to be handed over and/or the failure reason; sixth, the first base station determines whether to initiate a handover of another handover type to the second base station according to the feedback message.

The implementation process of the embodiment of the present application is described below with reference to examples.

Example One (A First Base Station is a gNB)

Figure 5:
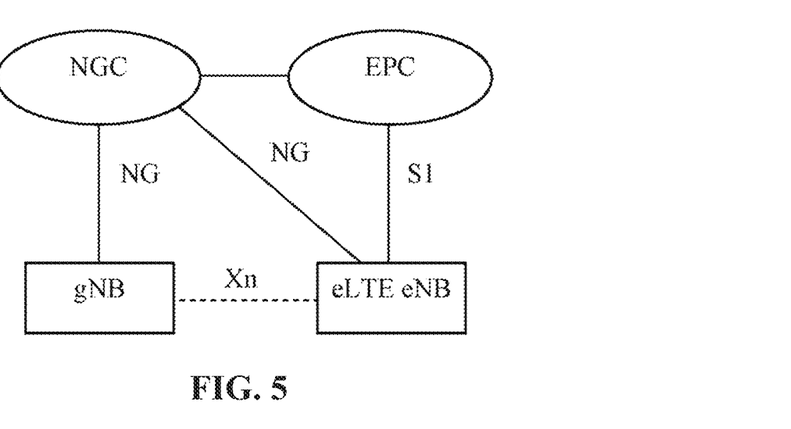
FIG. 5 is a schematic diagram of a network architecture of examples 1 and 2 of the present disclosure.
Figure 6:
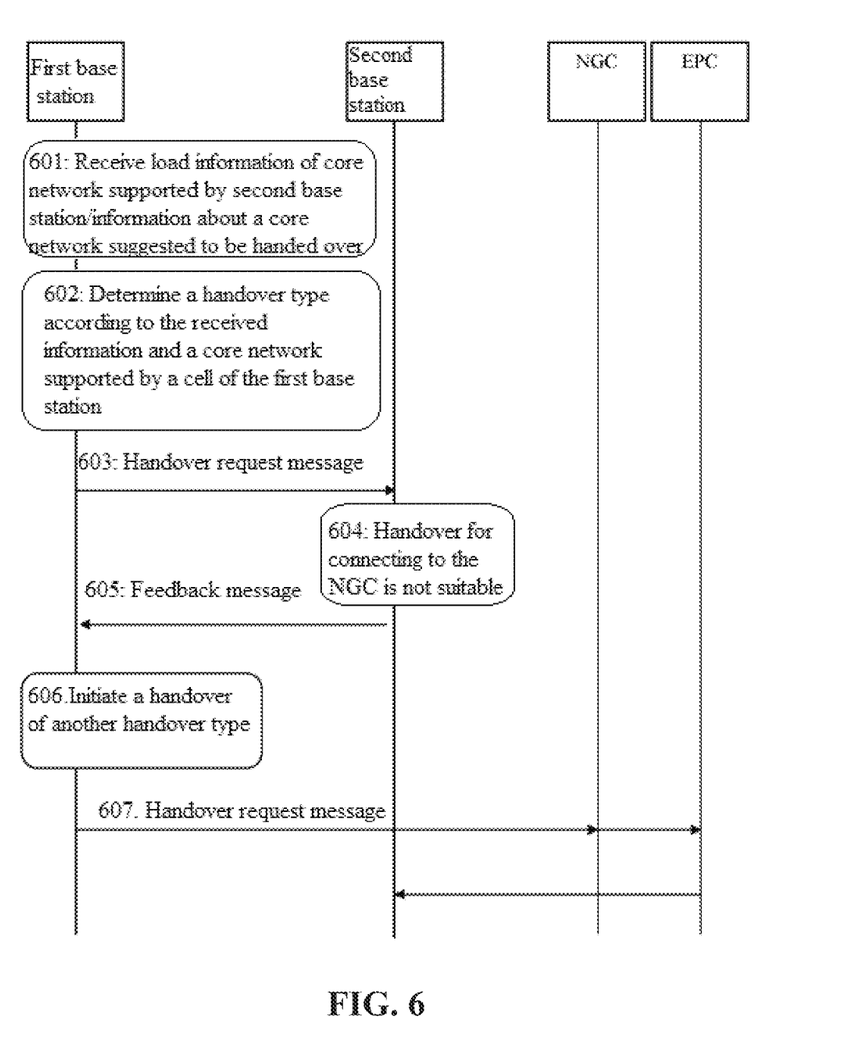
FIG. 6 is a flowchart of example 1 of the present disclosure.

As shown in FIGS. 5 and 6, a handover process of the embodiment may include steps described below.

In step 601, a first base station receives load information for each core network supported by a cell of a second base station (TNL load connected to a NGC and TNL load connected to an EPC).

In step 602, a first base station determines a handover type (such as a handover for connecting to the NGC) according to load information for each core network supported by a cell of a second base station (TNL load connected to a NGC and TNL load connected to an EPC) and a core network (the NGC) supported by a cell of the first base station.

In step 603, the first base station transmits the handover request message to the second base station and carries the handover type (such as the handover for connecting to the NGC).

In actual application, the handover type is indicated through a cell carried in the handover request message. For example, a cell of an enumerated type is carried in the handover request message, the enumerated value indicates a handover for connecting to the EPC, the handover for connecting to the NGC. When the enumerated value is the handover for connecting to the EPC, it is represented that the handover type carried in the handover request message is the handover for connecting to the EPC, and when the enumerated value is the handover for connecting to the NGC, it is represented that the handover type carried in the handover request message is the handover for connecting to the NGC.

In step 604, the second base station considers that the handover for connecting to the NGC is not suitable to be performed currently and suggests to perform the handover for connecting to the EPC.

In step 605, the second base station returns the feedback message to the first base station, the feedback message carries information about a core network suggested to be handed over (EPC). In actual application, the information about a core network suggested to be handed over is indicated through a cell carried in the feedback message. For example, a cell of an enumerated type is carried in the feedback message, the enumerated value is: EPC, NGC. When the enumerated value is the EPC, it is represented that the information about a core network suggested to be handed over carried in the feedback message is the EPC, when the enumerated value is the NGC, the information about a core network suggested to be handed over carried in the feedback message is the NGC.

In step 606, the first base station determines to initiate a handover of another handover type to the second base station according to the feedback message.

In step 607, the first base station transmits a handover request message crossing the core network to the second base station through a NG interface, a core network NGC and an EPC and S1 interface.

Here, the handover request crossing the core network means that the handover request message transmitted by the first base station crosses more than one core networks to reach the second base station. In actual applications, generally, when other simple handover requests are rejected or no other simple handover is provided, the handover request crossing the core network may be used, and the first base station may also decide to use the handover request crossing the core network at any time.

Embodiment Two (A First Base Station is a gNB)

Figure 7:
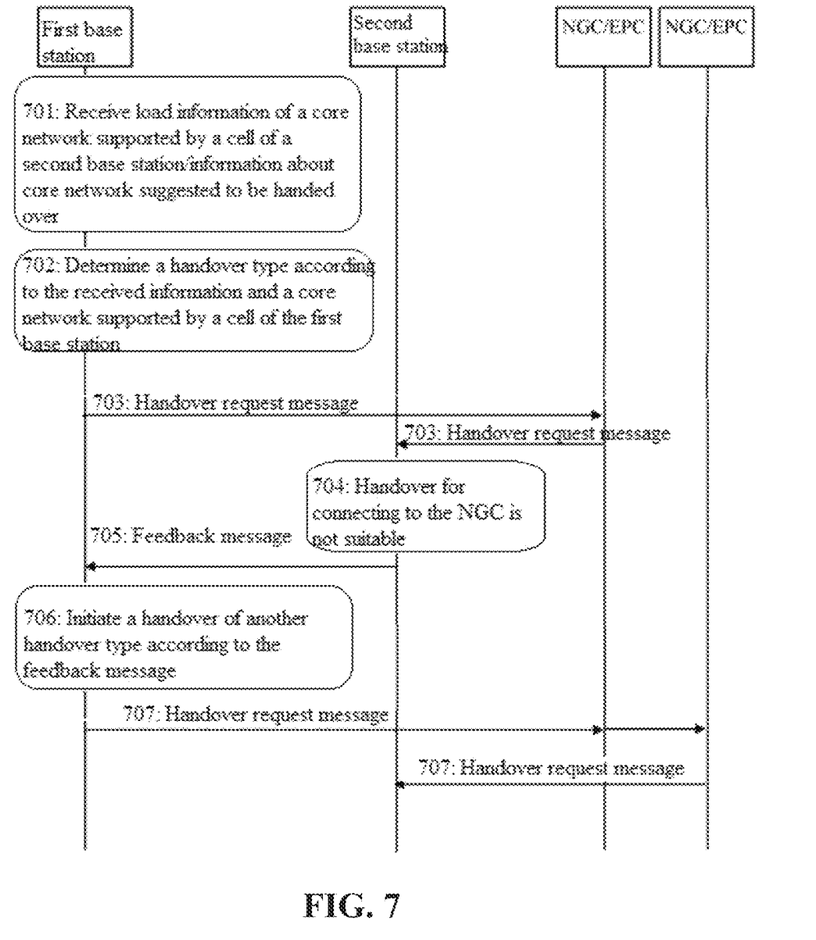
FIG. 7 is a flowchart of example 2 of the present disclosure.

As shown in FIGS. 5 and 7, a handover process of the embodiment may include steps described below.

A step 701 is the same as that in the example one.
A step 702 is the same as that in the example one.
In step 703, the first base station transmits a handover request message to the second base station through a NG interface, a core network NGC and a NG interface.

In step 704, the second base station considers that the handover for connecting to the NGC is not suitable to be performed currently because a current connection to NCG is congested.

In step 705, the second base station returns the feedback message to the first base station, the feedback message carries a failure reason (the connection to NCG is congested).

A step 706 is the same as that in the example one.
A step 707 is the same as that in the example one.

Embodiment Three (A First Base Station is a LTE eNB)

Figure 8:
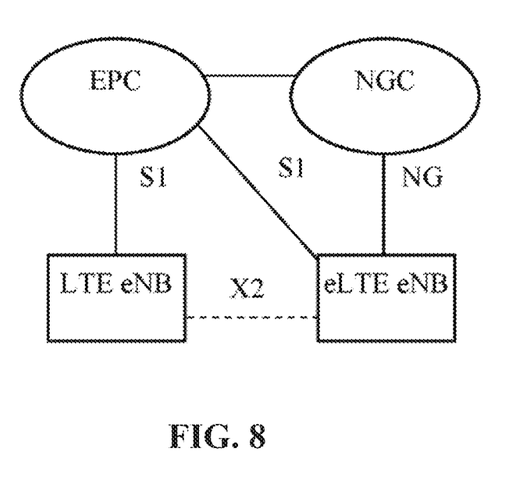
FIG. 8 is a schematic diagram of a network architecture of example 3 of the present disclosure.
Figure 9:
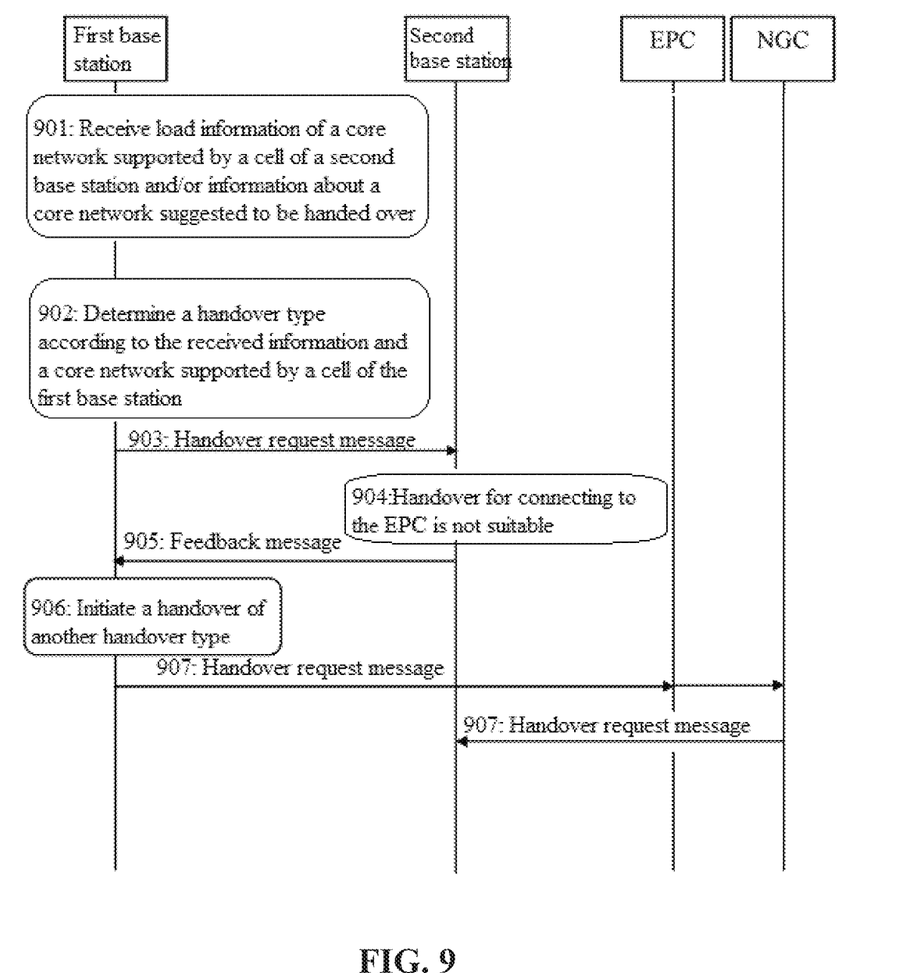
FIG. 9 is a flowchart of example 3 of the present disclosure.

As shown in FIGS. 8 and 9, a handover process of the embodiment may include steps described below.

In step 901, a first base station receives load information for each core network supported by a cell of a second base station (TNL load connected to a NGC and TNL load connected to an EPC).

In step 902, a first base station, according to the received load information for each core network supported by the cell of the second base station (TNL load connected to a NGC and TNL load connected to an EPC) and a core network (supporting the EPC) supported by a cell of the first base station, determines a handover type (such as a handover for connecting to the EPC).

In step 903, the first base station transmits a new handover request message to the second base station (such as a handover request message for connecting to the EPC).

In step 904, the second base station considers that the handover for connecting to the EPC is not suitable to be performed currently and suggests to perform the handover for connecting to the NGC.

In step 905, the second base station returns the feedback message to the first base station, the feedback message carries information about a core network suggested to be handed over (NGC).

In step 906, the first base station determines to initiate a handover of another handover type to the second base station according to the feedback message.

In step 907, the first base station transmits a handover request message to the second base station through a S1 interface, a core network EPC and a NGC and NG interface.

Embodiment Four (A First Base Station is an eLTE eNB)

Figure 10:
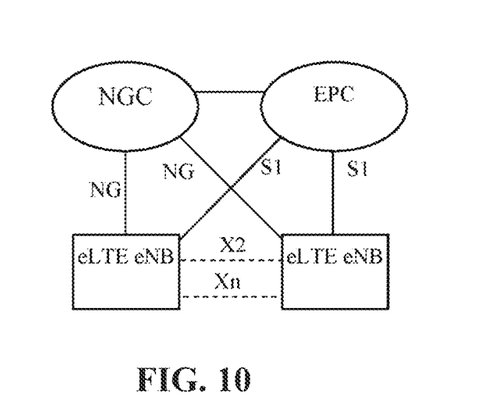
FIG. 10 is a schematic diagram of a network architecture of example 4 of the present disclosure.
Figure 11:
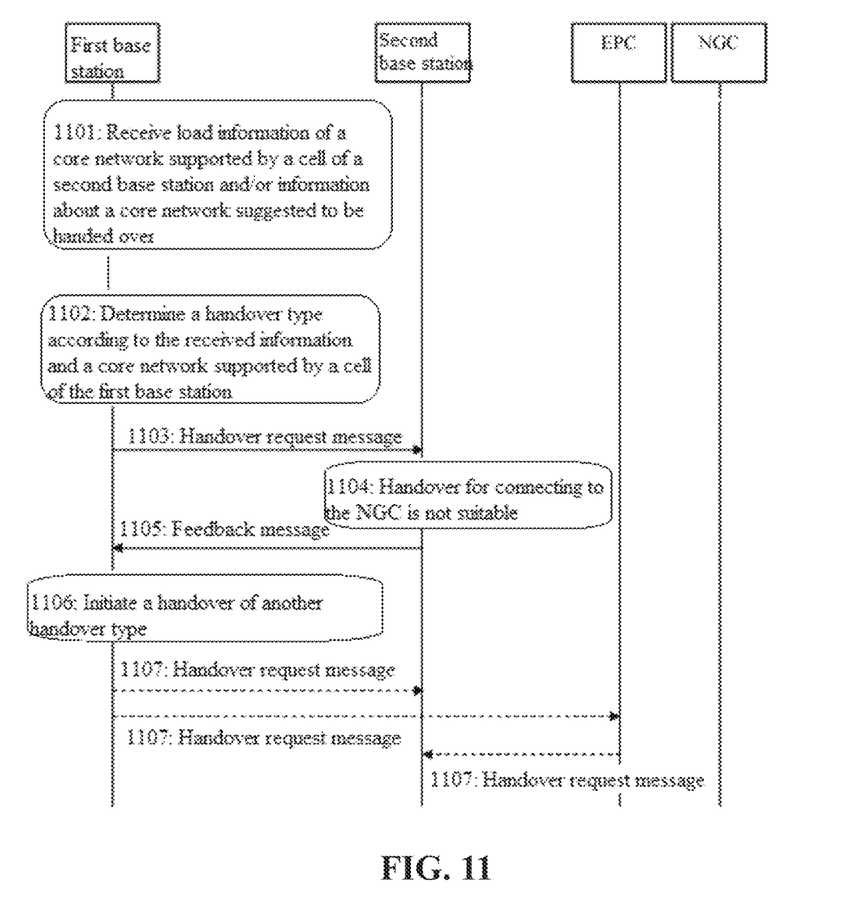
FIG. 11 is a flowchart of example 4 of the present disclosure.

As shown in FIGS. 10 and 11, a handover process of the embodiment may include steps described below.

In step 1101, a first base station receives load information for each core network supported by a cell of a second base station (TNL load connected to a NGC and TNL load connected to an EPC).

In step 1102, a first base station determines a handover type (such as a handover for connecting to the NGC) according to load information for each core network supported by a cell of a second base station (TNL load connected to a NGC and TNL load connected to an EPC) and a core network (supporting the EPC and the NGC) supported by a cell of the first base station.

In step 1103, the first base station transmits the handover request message to the second base station through a new TNL interface between base stations (such as a TNL interface specifically for an Xn interface message).

In step 1104, the second base station knows that a handover of the TNL interface specifically for the Xn interface message is the handover for connecting to the NGC, the second base station considers that the handover for connecting to the NGC is not suitable to be performed currently and suggests to perform a handover for connecting to the EPC.

In step 1105, the second base station returns the feedback message to the first base station, the feedback message carries information about a core network suggested to be handed over (EPC).

In step 1106, the first base station determines to initiate a handover of another handover type to the second base station according to the feedback message.

In step 1107, the first base station transmits the handover request message to the second base station through an X2 interface; or the base station transmits the handover request message to the second base station through an S1 interface, a core network EPC and an S1 interface.

Here, the first base station may determines the handover type corresponding to the handover request message initiated in the step 1107 according to the situation (such as measurement information of the cell of the second base station, load information of the cell of the second base station and an available interface between the first base station and the second base station).

Embodiment Five (A First Base Station is an eLTE eNB)

Figure 12:
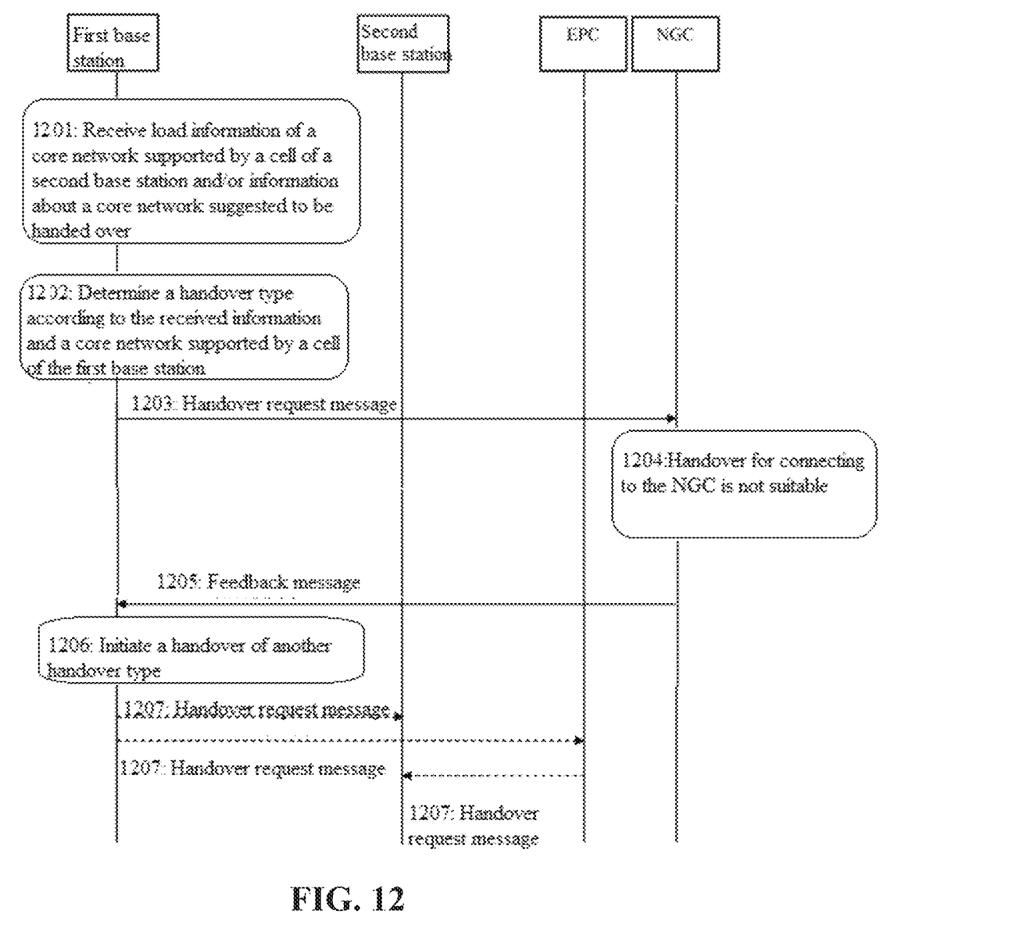
FIG. 12 is a flowchart of example 5 of the present disclosure.

As shown in FIG. 12, a handover process of the embodiment may include steps described below. In step 1201, a first base station receives load information for each core network supported by a cell of a second base station (TNL load connected to a NGC and TNL load connected to an EPC).

In step 1202, a first base station, according to the received load information for each core network supported by a cell of a second base station (TNL load connected to a NGC and TNL load connected to an EPC) and a core network (supporting the EPC and the NGC) supported by a cell of the first base station, determines a handover type (such as a handover for connecting to the NGC).

In step 1203, the first base station transmits a handover request message to the second base station through a NG interface, a core network NGC and a NG interface.

In step 1204, a NGC control plane considers that the handover for connecting to the NGC is not suitable to be performed currently because a current connection to NCG is congested.

In step 1205, the NGC returns the feedback message to the first base station, the feedback message carries a failure reason (the connection to NCG is congested).

In step 1206, the first base station determines to initiate a handover of another handover type to the second base station according to the feedback message.

In step 1207, the first base station transmits the handover request message to the second base station through an X2 interface; or the base station transmits the handover request message to the second base station through an S1 interface, a core network EPC and an S1 interface.

Additionally, embodiments of the present disclosure further provide a computer-readable storage medium configured to store computer-executable instructions for implementing the handover method for core networks when the computer-executable instructions are executed.

Additionally, embodiments of the present disclosure further provide a computer-readable storage medium configured to store computer-executable instructions for implementing another handover method for core networks when the computer-executable instructions are executed.

Optionally, in the embodiment, the above storage medium may include, but is not limited to, a USB flash drive, a read-only memory (ROM), a random access memory (RAM), a mobile hard disk, a magnetic disk, an optical disk or another medium capable of storing program codes.

Optionally, in the embodiment, a processor executes the steps in the methods described in the above embodiments according to the program codes stored in the storage medium.

Optionally, for specific examples in the present embodiment, reference may be made to the examples described in the above-mentioned embodiments and optional embodiments, and repetition will not be made in the present embodiment.

It should be understood by those skilled in the art that all or some steps in the methods described above may be implemented by relevant hardware (such as a processor) as instructed by programs, and the programs may be stored in a computer-readable storage medium, such as a read-only memory, a magnetic disk, an optical disk or the like. Optionally, all or some steps in the embodiments described above may also be implemented by using one or more integrated circuits. Accordingly, the various modules/units in the embodiments described above may be implemented by hardware. For example, the functions of these modules/units may be implemented by one or more integrated circuits. These modules/units may also be implemented in the form of software function modules. For example, the functions of these modules/units may be implemented by using a processor to execute programs/instructions stored in a memory. The present application is not limited to any specific combination of hardware and software.

The above illustrate and describe the basic principles, main features and advantages of the present application. The present application is not limited to the embodiments described above. The above embodiments and specification describe only the principles of the present application.

Various modifications and improvements may be made in the present application without departing from the spirit and scope of the present application. These modifications and improvements are within the scope of the present application.

INDUSTRIAL APPLICABILITY

The present disclosure, which is applicable to the communications, in the 5G network, especially when the second base station is connected to multiple core networks, is able to implement the selection of handover type and the handover among the multiple core networks.

What is claimed is:

1. A handover method involving multiple core networks, comprising:
   transmitting, by a first base station, a handover request message to a second base station directly or through a core network;
   receiving, by the first base station, a feedback message from the core network or the second base station, wherein the feedback message carries at least one of: information about a core network suggested to be handed over; or a failure reason;
   wherein before the handover request message is transmitted to the second base station, the method further comprises: receiving at least one of information about a core network suggested to be handed over, or load information for each core network of the multiple core networks supported by a cell of the second base station; and determining a handover type according to the at least one of information about a core network suggested to be handed over, or load information for each core network of the multiple core networks supported by the cell of the second base station; and
   wherein transmitting, by the first base station, the handover request message to the second base station comprises: transmitting a corresponding handover request message to the second base station according to the determined handover type,
   wherein transmitting, by the first base station, the handover request message to the second base station comprises one of:
      transmitting, by the first base station, the handover request message to the second base station, wherein the handover request message carries the handover type, and the handover type indicates a handover for connecting to a Next Generation Core Network (NGC) or a handover for connecting to an Evolved Packet Core (EPC);
      transmitting, by the first base station, a new handover request message to the second base station, wherein the new handover request message is one of: an Xn interface handover request message, a handover request message for connecting to the NGC, or a handover request message for connecting to the EPC; or
      transmitting, by the first base station, the handover request message to the second base station through a new Transport Network Layer (TNL) interface between the base stations, the new TNL interface between the base stations is a TNL interface for an Xn interface message.

2. The method of claim 1, wherein after the feedback message from the second base station is received, the method further comprises:
   determining, based on the feedback message, whether to initiate a handover request message of another handover type to the second base station, wherein the another handover type is different from the handover type initiated by the handover request message.

3. The method of claim 1, wherein after the feedback message from the second base station is received, the method further comprises:
in response to determining to initiate a handover request message of another handover type to the second base station, redetermining a handover type according to the information about a core network suggested to be handed over by the second base station and information about a core network supported by a cell of the first base station; and
retransmitting the handover request message to the second base station, wherein the handover request message carries information about the redetermined handover type.

4. A handover method involving multiple core networks, comprising:
receiving a handover request message from a first base station;
transmitting a feedback message to the first base station, wherein the feedback message carries at least one of: information about a core network suggested to be handed over; or a failure reason;
wherein before the handover request message is received from the first base station, the method further comprises: transmitting at least one of information about a core network suggested to be handed over or load information for each core network of the multiple core networks supported by a cell of a second base station to the first base station to enable the first base station to determine a handover type corresponding to the handover request message, wherein the handover request message satisfies one of:
carrying the handover type, wherein the handover type indicates a handover for connecting to a Next Generation Core Network (NGC) or a handover for connecting to an Evolved Packet Core (EPC);
being one of: an Xn interface handover request message, a handover request message for connecting to the NGC, or a handover request message for connecting to the EPC; or
being transmitted through a new Transport Network Layer (TNL) interface between base stations, wherein the new TNL interface between the base stations is a TNL interface for an Xn interface message.

5. The method of claim 4, wherein transmitting the feedback message to the first base station comprises:
in response to determining that a handover of the handover type carried in the handover request message is incapable of being executed, returning the feedback message to the first base station.

6. A handover method involving multiple core networks, comprising:
receiving a handover request message from a first base station;
transmitting a feedback message to the first base station, wherein the feedback message carries at least one of: information about a core network suggested to be handed over; or a failure reason;
wherein before the handover request message is received from the first base station, the method further comprises: transmitting at least one of information about a core network suggested to be handed over or load information for each core network of the multiple core networks supported by a cell of a second base station to the first base station to enable the first base station to determine a handover type corresponding to the handover request message, wherein the handover request message satisfies one of:
carrying the handover type, wherein the handover type indicates a handover for connecting to a Next Generation Core Network (NGC) or a handover for connecting to an Evolved Packet Core (EPC);
being one of: an Xn interface handover request message, a handover request message for connecting to the NGC, or a handover request message for connecting to the EPC; or
being transmitted through a new Transport Network Layer (TNL) interface between base stations, wherein the new TNL interface between the base stations is a TNL interface for an Xn interface message.

7. A handover device involving multiple core networks, comprising a processor and a storage device for storing computer executable instructions that when executed by the processor cause the processor to:
transmit a handover request message to a second base station directly or transmit the handover request message to the second base station through a core network;
receive a feedback message from the core network or the second base station, wherein the feedback message carries at least one of: information about a core network suggested to be handed over; or a failure reason;
wherein before the handover request message is transmitted to the second base station, the processor is further caused to: receive at least one of information about a core network suggested to be handed over, or load information for each core network of the multiple core networks supported by a cell of the second base station; and determine a handover type according to the at least one of information about a core network suggested to be handed over, or load information for each core network of the multiple core networks supported by the cell of the second base station; and
wherein the processor is further caused to transmit the handover request message to the second base station in following manners: transmit a corresponding handover request message to the second base station according to the determined handover type,
wherein the processor is further caused to transmit the handover request message to the second base station in one of following manners:
transmit the handover request message to the second base station, wherein the handover request message carries the handover type, and the handover type indicates a handover for connecting to a Next Generation Core Network (NGC) or a handover for connecting to an Evolved Packet Core (EPC);
transmit a new handover request message to the second base station, wherein the new handover request message is one of: an Xn interface handover request message, a handover request message for connecting to the NGC, or a handover request message for connecting to the EPC; or
transmit the handover request message to the second base station through a new Transport Network Layer (TNL) interface between base stations, wherein the new TNL interface between the base stations is a TNL interface for an Xn interface message.

8. The device of claim 7, wherein the processor is further caused to determine whether to initiate a handover request message of another handover type to the second base station according to the feedback message, wherein the another handover type is different from the handover type initiated by the handover request message.

9. The device of claim 7, wherein the processor is further caused to, in response to determining to initiate a handover request message of another handover type to the second base station, redetermine a handover type according to the information about a core network suggested to be handed over by the second base station and core network information supported by a cell of the first base station; and retransmit the handover request message to the second base station, wherein the handover request message carries information about the handover type redetermined by the first determination module.

10. A handover device involving multiple core networks, comprising a processor and a storage device for storing computer executable instructions that when executed by the processor cause the processor to perform the method of claim 2, wherein the method comprises:
    receiving a handover request message from a first base station;
    transmitting a feedback message to the first base station, wherein the feedback message carries at least one of: information about a core network suggested to be handed over; or a failure reason;
    wherein before the handover request message is received from the first base station, the method further comprises: transmitting at least one of information about a core network suggested to be handed over or load information for each core network of the multiple core networks supported by a cell of a second base station to the first base station to enable the first base station to determine a handover type corresponding to the handover request message,
    wherein the handover request message satisfies one of:
        carrying the handover type, wherein the handover type indicates a handover for connecting to a Next Generation Core Network (NGC) or a handover for connecting to an Evolved Packet Core (EPC);
        being one of: an Xn interface handover request message, a handover request message for connecting to the NGC, or a handover request message for connecting to the EPC; or
        being transmitted through a new Transport Network Layer (TNL) interface between base stations, wherein the new TNL interface between the base stations is a TNL interface for an Xn interface message.

11. The device of claim 10, wherein the processor is further cause to:
    in response to determining that handover of the handover type is incapable of being executed, return the feedback message to the first base station.

12. The device of claim 10, wherein the processor is further caused to receive a handover request message retransmitted by the first base station.

* * * * *

UNITED STATES PATENT AND TRADEMARK OFFICE
CERTIFICATE OF CORRECTION

PATENT NO. : 11,206,585 B2
APPLICATION NO. : 16/496854
DATED : December 21, 2021
INVENTOR(S) : He Huang It is certified that error appears in the above-identified patent and that said Letters Patent is hereby corrected as shown below:

In the Specification

In Column 9, Line 39, delete "reason," and insert --reason.--.

In Column 11, Line 29, delete "NCG" and insert --NGC--.

In Column 11, Line 33, delete "NCG" and insert --NGC--.

In Column 13, Line 6, delete "NCG" and insert --NGC--.

In Column 13, Line 10, delete "NCG" and insert --NGC--.

In the Claims

In Columns 15-16, Lines 53-67, Claim 4, delete "A handover method involving multiple core networks, comprising: receiving a handover request message from a first base station; transmitting a feedback message to the first base station, wherein the feedback message carries at least one of: information about a core network suggested to be handed over; or a failure reason; wherein before the handover request message is received from the first base station, the method further comprises: transmitting at least one of information about a core network suggested to be handed over or load information for each core network of the multiple core networks supported by a cell of a second base station to the first base station to enable the first base station to determine a handover type corresponding to the handover request message, wherein the handover request message satisfies one of: carrying the handover type, wherein the handover type indicates a handover for connecting to a Next Generation Core Network (NGC) or a handover for connecting to an Evolved Packet Core (EPC); being one of: an Xn interface handover request message, a handover request message for connecting to the NGC, or a handover request message for connecting to the EPC; or being transmitted through a new Transport Network Layer (TNL) interface between base stations, wherein the new TNL interface between the base stations is a TNL interface for an Xn interface message." and insert --The method of claim 4, wherein after the feedback message is transmitted to the first base Signed and Sealed this
Seventeenth Day of May, 2022

Katherine Kelly Vidal
*Director of the United States Patent and Trademark Office* station, the method further comprises: receiving a handover request message retransmitted by the first base station.--.

In Column 17, Claim 10, Line 18 (Approx.), delete "claim 2," and insert --claim 4,--.

In Column 18, Claim 11, Line 21, delete "cause" and insert --caused--.